Patented Mar. 19, 1935

1,994,496

UNITED STATES PATENT OFFICE 1,994,496

STABILIZED YEASTED MILK SUSPENSION AND METHOD OF MAKING THE SAME

Louis Warncke, Weehawken, N. J., assignor to Charles L. Patterson

No Drawing. Application December 21, 1931, Serial No. 582,497

15 Claims. (Cl. 99—11)

My present invention is concerned with the provision of a modified milk beverage and a method of manufacturing it. It finds its preferred embodiment in a process for manufacturing yeasted milk and the product of such process.

More specifically, the present invention represents an improvement in the process and product described in my copending application Serial No. 450,315, filed May 6, 1930.

An object of the invention is to produce a highly palatable modified milk beverage containing substantially pure yeast and to thereby eliminate the present necessity for consuming the yeast cake in a highly unpalatable form and in a form in which the consumer who is eating the yeast for medicinal purposes is obliged to consume a considerable quantity of starch which may in some cases offset, at least in part, the medicinal value of the yeast itself.

Another object is to provide a yeasted milk which will fully meet the requirements of the board of health regulations as to pasteurization, and yet which will contain the essential vitamins A, $B_1$, D and G (the latter being the anti-pellagric vitamin which can be autoclaved and which is also known as $B_2$).

Another object of the invention is to provide a yeasted milk of the highly nutritive and medicinal character set forth above in which all of the nutritive values of the yeast and milk are combined and the characteristics of both yeast and milk which tend to render both substances unpalatable to certain people are substantially neutralized and offset one by the other, the resulting beverage containing none of the chalky taste which characterizes skimmed milk and the sugar and fatty content of the milk almost completely disguising the taste of the yeast so that the beverage has a sweet creamy taste with a faint yeast flavor.

Another object of the invention is to provide a method of making the beverage which may be carried out with expedition and facility and which will avoid the necessity for utilizing a greater number of heating and cooling steps than those employed in the usual pasteurizing process.

Another object is to provide a yeasted milk in which the yeast cells will not settle out and deposit in the bottom of the bottle even though the milk has stood for a long period of time, and even though the milk has been subjected to widely varying temperatures.

Another object is to provide a beverage of this character containing in addition to the yeasted milk, a suspension stabilizing agent having a recognized nutritive value of its own yet substantially tasteless in the suspension and not noticeably affecting the consistency of the suspension.

Another more specific object is to provide a homogenized sweet milk containing live yeast in suspension, and containing gelatin as a suspension stabilizer and retaining the full nutritive and medicinal value of all three of these substances.

In accordance with a preferred embodiment of the method, I take a batch of any kind of sweet raw milk, that is to say, milk including all of the fatty and albuminous content, and pasteurize it by heating it to a temperature of above 143 degrees F., and holding it at this heat for at least a half hour as called for by the board of health regulations. This heat, maintained over the specified period, destroys dangerous pathogenic organisms.

While this batch is at the pasteurizing temperature or is just starting to cool down below the pasteurizing temperature I preferably introduce a small batch of pre-pasteurized milk containing the proper amount of gelatin dissolved therein. If desired, the gelatin may be dissolved in the unpasteurized milk and introduced into the batch at the pasteurizing temperature. Preferably the gelatin added is about .6% of the total batch of milk and in a typical batch of eleven quarts of milk two quarts may be used to dissolve the gelatin.

The purpose of the gelatin which is recognized as a stabilizer of emulsions, is to produce in the present instance a stabilized suspension having colloidal characteristics, particularly at low temperatures which will prevent the yeast cells or particles from settling out.

The pasteurized gelatinized milk is then cooled rapidly down to at least 120 degrees F. preferably to about 116 degrees and liquid yeast is added to the batch. The amount of yeast added may vary considerably since it is entirely possible to make a very concentrated yeasted milk solution, but inasmuch as the usual medical requirement for patients requiring yeast is about three cakes a day, I prefer to add about one and one-half ounces of yeast for each quart of gelatinized milk in the batch or roughly one pound to a batch of eleven quarts of milk. This amount is equivalent to about three cakes of the ordinary yeast per quart of milk but is less by volume than the three cakes, due to the fact that I employ yeast which is substantially devoid of starch.

Preferably the yeast which is to be added is first dissolved in prepasteurized milk at a temperature of about 100 degrees F., and in the quantity of one pound of yeast to one quart of milk. This dissolving action is merely intended to facilitate the complete and thorough mixture of the yeast with the batch of gelatinized milk, and it is, of course, within the scope of the invention to introduce active or viable yeast directly into the partially cooled milk containing the gelatin.

The temperature of the batch when the yeast is introduced therein may run at least as high as 120 degrees F. and at least as low as 100 degrees F. I do not intend to limit myself definitely to these temperature ranges but they have been found most effective in practice. A temperature of about 116 degrees F. is preferred. If the yeast is introduced at a temperature much above 120 degrees, many of the yeast cells are killed, being unable to withstand the heat, and if the yeast is introduced when the milk is much below 100 degrees or below body temperature, the fat in the milk is difficult to emulsify.

Having added the yeast to the batch the latter is then cooled to approximately 100 degrees F. (thus guarding against destruction of any yeast germs) and immediately run through a homogenizer, emulsifier, viscolizer, colloid mill, high pressure pump or under a pressure of preferably about 2000 pounds per square inch, this pressure of course being subject to variation in accordance with the amount of yeast contained in the milk and with the characteristics of the milk itself.

The homogenizer, which may be of conventional type, in which a fine stream of milk under high pressure is squirted against a baffle plate, apparently serves a triple function in the present process. In the first place, it completely breaks down the fatty or albuminous globules in the milk and forms a complete emulsion to prevent subsequent stratification by gravity of the milk contents so that no cream will rise to the surface even though the emulsion be kept in an ice box or even subjected to widely varying temperatures for several days. Secondly the emulsifying under pressure increases the viscosity of the milk. The third function apparently performed by the homogenizer is to break up the yeast into individual cells or small cell groups thereby producing a yeast suspension.

There is not sufficient information available on the subject of the yeast cell to enable me to unqualifiedly state just what occurs in the homogenizing operation or to state exactly how (disregarding the gelatin) a yeast suspension is produced. I may advance the tentative theory that the yeast which is a vegetable-like growth of linked or stringy cellular construction has its cells broken up and separated in the homogenizer and that these cells may have a tendency to cling to the fatty particles which are in suspension or in emulsion in the milk.

With gelatin added and with the homogenizing mixture cooled down to ice box temperatures say about 55° I find that the live yeast cells apparently remain in a substantially dormant condition, the yeast content showing no tendency to increase materially. The gelatin which forms part of the mixture acts at these temperatures to indefinitely stabilize the yeast suspension.

In a similar suspension devoid of gelatin the yeast cells tend to slowly settle out due, I believe, to the slight difference in specific gravity between the yeast cells and the solution which is produced by homogenizing the milk. My tentative theory of explanation of the suspension by the yeast of gelatin is as follows:—

Gelatin has the physical property of forming a colloidal (net work structure) which develops when the emulsion is aged at low temperature. Gelatin is known as a "stabilizer of emulsions". Submicroscopic particles of gelatin occlude large amounts of water, whereby the relative volume occupied by the gelatin is increased. These microscopic particles are the beginning of a continuous gel, to which the gelatin solution has a tendency to set.

There is apparently a colloidal structure built up in the emulsion which has varying degrees of stability dependent upon concentration, temperature and time. Freedom of motion is lost at the setting point and the adjacent aggregates (yeast, fat, casein and gelatin particles) cohere. Milk allowed to stand for a time at low temperatures becomes more viscous. Homogenized milk has a still greater viscosity. During the aging of the emulsion such as that described herein, I assume that the increase in viscosity is due to absorption of the casein and other colloids by the fat. With an increase in the amount of fat or the division of the fat globules by homogenization, there is a corresponding increase in the surface area to which colloids may be absorbed, the fat being in the form of globules the size of which determines to a large extent the amount of colloids absorbed.

There is some evidence to indicate that the addition of the small amount of gelatin also increases the specific gravity of the homogenized milk to a point where it is substantially identical with the specific gravity of the yeast cells. This increase in specific gravity is very slight but it apparently aids to some extent at least in retarding or preventing the settling out of the yeast at room temperatures.

In practicing the method, the milk after homogenization is cooled with sufficient rapidity to take advantage of desirable stabilizing property of the gelatin before any settling out of yeast can occur, even where the specific gravity of the yeast cells and the homogenized gelatinized milk are not identical.

A quart of milk formed in accordance with the disclosure of this application contains approximately the nutritive value of a quart of pasteurized milk plus the nutritive value of a slight amount of gelatin and plus about three cakes of ordinary yeast without the starch which is commonly used in such cakes. By yeasting the milk the valuable vitamins $B_1$, D and $B_2$ are added to the vitamins A and $B_1$ and sometimes D contained in the milk and a highly nutritive and palatable beverage is obtained in which the $B_1$, $B_2$ and D vitamins predominate.

By practicing the process as described, an entirely unforeseen result is obtained insofar as the palatability of the final product is concerned.

An ounce and a half of yeast simply dissolved in ordinary milk gives the milk a very decided yeasty flavor, and a beverage thus produced is only slightly less palatable than a dry yeast cake. The homogenizing process which I utilize, however, seems to so thoroughly mix the yeast with the creamy and sugary content of the milk that the resultant beverage is highly palatable. It has a very faint yeasty taste and it does not have either the greasy and somewhat sickening taste of cream nor does it have the chalky taste of skimmed milk. The beverage, which has little more viscosity than ordinary milk and which is in fact less viscous than cream, has a somewhat sweet and not unpleasant creamy taste with a very faint tang of yeast. Apparently, the natural flavors of the yeast and the milk counteract each other to a large extent, with a resultant product which is more palatable than either of them alone.

While I have discussed the palatability of the beverage formed exactly in accordance with my process, it will be understood of course that it is within the scope of the invention to dissolve any desirable flavoring material, such for instance as chocolate, in the beverage, in which instance the presence of yeast will be hard to detect by tasting the beverage.

While the product is primarily intended for beverage purposes, one of its advantages is that it can be used for cooking and when so used the product cooked with the milk, or the milk or cream sauce on the product, has no flavor of yeast whatsoever. This is due to the fact that the usual cooking temperatures are well above 120° so that all of the yeast cells are killed and the aroma of the yeast is killed with them.

Having thus described my invention, what I claim as new and desire to secure by Letters Patent is:—

1. As a new foodstuff, a suspension consisting of homogenized sweet milk and yeast and less than 1% of a stabilizing agent.

2. As a new foodstuff, a suspension consisting of homogenized sweet milk and yeast and less than 1% of a colloidal stabilizing agent highly viscous at low temperatures.

3. As a new foodstuff, a beverage consisting of pasteurized, homogenized, raw, sweet milk and yeast and a small amount of gelatin.

4. As a new foodstuff, homogenized, pasteurized, raw, sweet milk including a small proportion of live but dormant liquid yeast and a smaller proportion of a colloidal suspension stabilizing agent.

5. As a new foodstuff, homogenized, pasteurized, raw, sweet milk including a small proportion of live but dormant liquid yeast and a smaller proportion of a suspension stabilizing agent, said agent comprising gelatin in proportions of less than 1% of the batch.

6. As a new foodstuff, homogenized, pasteurized, raw, sweet milk including a small proportion of yeast distributed substantially uniformly throughout the milk and a lesser proportion of gelatin stabilizing the yeast suspension.

7. A method of producing a stabilized suspension of yeast in milk which includes the steps of introducing yeast and gelatin into the milk and homogenizing the mixture thus formed.

8. A method of producing a stabilized suspension of yeast in milk which includes the steps of introducing yeast and gelatin into the milk and homogenizing the mixture thus formed, the homogenization being effected under a pressure in the order of two thousand pounds per square inch.

9. A method of forming a stabilized suspension of yeasted milk which includes the steps of subjecting the milk to a pasteurizing temperature of about 143° F., adding a small amount of gelatin to the milk, cooling the milk to about 116° F., introducing a small amount of liquid yeast into the milk at a temperature of 116° F. and 100° F. and running the mixture thus formed through a homogenizer under high pressure.

10. A method as set forth in claim 9 wherein the gelatin comprises approximately .6% of the batch.

11. The method as set forth in claim 9 wherein the homogenized mixture is rapidly cooled to a temperature where the yeast cells are substantially dormant.

12. A method as set forth in claim 9 wherein the mixture is run through the homogenizer at a pressure of about two thousand pounds per square inch.

13. A method of rendering more palatable and forming a stable suspension of raw milk containing yeast which includes the steps of adding gelatin and running the mixture through a homogenizer at high pressure.

14. As a new foodstuff, a suspension consisting of homogenized sweet milk and yeast and a colloidal stabilizing agent of greater viscosity than the milk whereby to deter settling out of the yeast from the suspension.

15. As a new foodstuff, milk rendered more viscous by homogenization and containing yeast in suspension together with a small amount of stabilizing agent of greater viscosity than the homogenized milk.

LOUIS WARNCKE.